United States Patent
Merchant et al.

(10) Patent No.: US 7,513,663 B2
(45) Date of Patent: Apr. 7, 2009

(54) ADAPTIVE LIGHTING SYSTEM HAVING DYNAMIC RECALIBRATION

(75) Inventors: Viren B. Merchant, Canton, MI (US); Yazan Fahd Hamzeh, Westland, MI (US); Terry Joseph Anson, Belleville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 177 days.

(21) Appl. No.: 11/739,947

(22) Filed: Apr. 25, 2007

(65) Prior Publication Data

US 2008/0263878 A1 Oct. 30, 2008

(51) Int. Cl.
*B60Q 1/00* (2006.01)
*B60R 22/00* (2006.01)

(52) U.S. Cl. .......... 362/465; 362/466
(58) Field of Classification Search .......... 362/37, 362/40, 41, 43, 48, 49, 51, 52, 56, 460, 464, 362/466, 467, 487, 507, 531, 532; 315/82; 701/49
See application file for complete search history.

(56) References Cited

U.S. PATENT DOCUMENTS

| | | | | |
|---|---|---|---|---|
| 5,562,336 A * | 10/1996 | Gotou | | 362/466 |
| 5,599,085 A * | 2/1997 | Tabata et al. | | 362/475 |
| 6,281,632 B1 * | 8/2001 | Stam et al. | | 315/82 |
| 6,761,476 B2 | 7/2004 | Pascutiu et al. | | |
| 7,226,193 B2 * | 6/2007 | Bahnmuller et al. | | 362/465 |
| 7,241,034 B2 * | 7/2007 | Smith et al. | | 362/465 |
| 2001/0019225 A1 * | 9/2001 | Toda et al. | | 307/10.8 |

* cited by examiner

*Primary Examiner*—Jacob Y Choi
(74) *Attorney, Agent, or Firm*—Brinks Hofer Gilson & Lione

(57) ABSTRACT

A system and method for dynamically recalibrating an adaptive lighting system includes a control module configured to instruct a motor to rotate a lamp to a first hard stop when the lamp positioned at a first soft stop. The system recalibrates the control module using the first hard stop as a reference point.

7 Claims, 6 Drawing Sheets

ADAPTIVE LIGHTING SYSTEM HAVING DYNAMIC RECALIBRATION

BACKGROUND

Field of the Invention

The present invention generally relates to adaptive forward lighting systems ("AFS systems"), and more specifically, to AFS systems and methods for calibrating AFS systems.

Forward lighting systems for automotive applications typically include at least two forward headlamps that illuminate an area in front of the automobile. Originally, the headlamps of these forward lighting systems were in a fixed position. Although being in a fixed position was optimal when the automobile was traveling in a straight line, when the automobile was traveling around a bend or corner, the fixed position of the headlamps resulted in the headlamps being in a less than optimal position. As a result, adaptive forward lighting systems have been developed that change the position of the headlamp of the automobile with respect to the steering angle of the automobile. For example, when the steering angle of the automobile is at 0°, the headlamp is positioned 0° referenced from a center line that is parallel to the length of the automobile. However, when the automobile is at a 165° steering angle, the headlamps are generally rotated 15° from the center line.

One significant drawback to current AFS systems is that AFS systems tend to lose their calibration after extended use. One solution to this problem is to calibrate the AFS system at startup. This is done by first driving the headlamp to a hard stop and then calibrating the AFS control system using the hard stop as a reference point. Although the system is relatively low cost, this calibration is only done once leaving the strong possibility that the AFS system will become uncalibrated as the automobile is driven over long periods of time.

In view of the above, it is apparent that there exists a need for an improved and cost effective system and method for calibrating AFS systems.

SUMMARY

In satisfying the above need, as well as overcoming the enumerated drawbacks and other limitations of the related art, the present invention provides a system and method for dynamically recalibrating an adaptive lighting system. The system includes a lamp pivotably mounted to a frame, wherein the lamp is configured to rotate with the aid of a motor about a central axis between two hard stops. A control module in electrical communication with the motor is configured to instruct the motor to rotate the lamp between a first soft stop and a second soft stop. The first soft stop is located between a first hard stop and a center line and the second soft stop is located between the second hard stop and the center line.

In order to recalibrate the system, the control module instructs the motor to rotate the lamp to the first hard stop when the lamp positioned at the first soft stop. Thereafter, the control module recalibrates itself by using the first hard stop as a reference point. Generally, the first soft stop is very close to the first hard stop and rotating the lamp to the first hard stop from the first soft stop will not provide any noticeable difference to the driver of the automobile. Since the likelihood that the lamp will be rotated to the first soft stop multiple times while operating the automobile, the AFS system will be recalibrated several times, thereby preventing the AFS system becoming uncalibrated.

Further objects, features and advantages of this invention will become readily apparent to persons skilled in the art after a review of the following description, with reference to the drawings and claims that are appended to and form a part of this specification.

DETAILED DESCRIPTION

Figure 1:
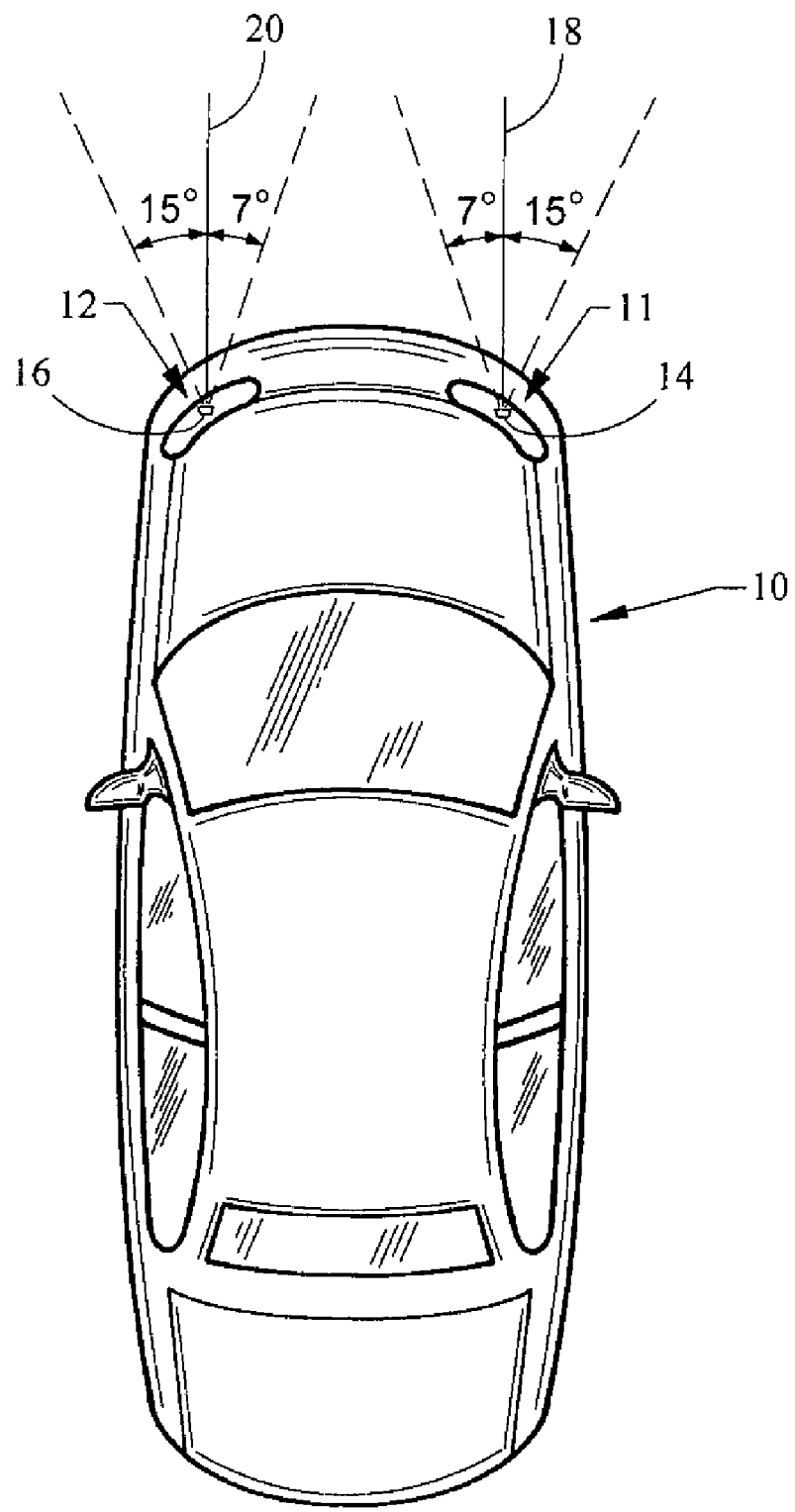
FIG. 1 is a plan view of an automobile incorporating an AFS system embodying the principles of the present invention.

Referring to FIG. 1, seen therein is an automobile 10 having a first and second adaptive forward lighting ("AFS") systems 11, 12. Each of the AFS systems 11, 12 have headlamps 14, 16 that are rotated in response to a steering wheel angle of the automobile 10. For example, when the automobile is traveling in a straight line, headlamps 14, 16 are projecting light 0° from the center lines 18, 20, respectively. However, when the automobile takes a sharp right turn, the headlamp 14 is generally rotated 15° to the right while the headlamp 16 is generally rotated about 7° to the right. Conversely, when the automobile 10 makes a sharp left turn, the headlamp 16 is generally rotated 15° to the left while the headlamp 14 is generally rotated about 7° to the left. Of course, the above described degrees of rotation are only examples. Different applications may require different degrees of rotation.

Figure 2:
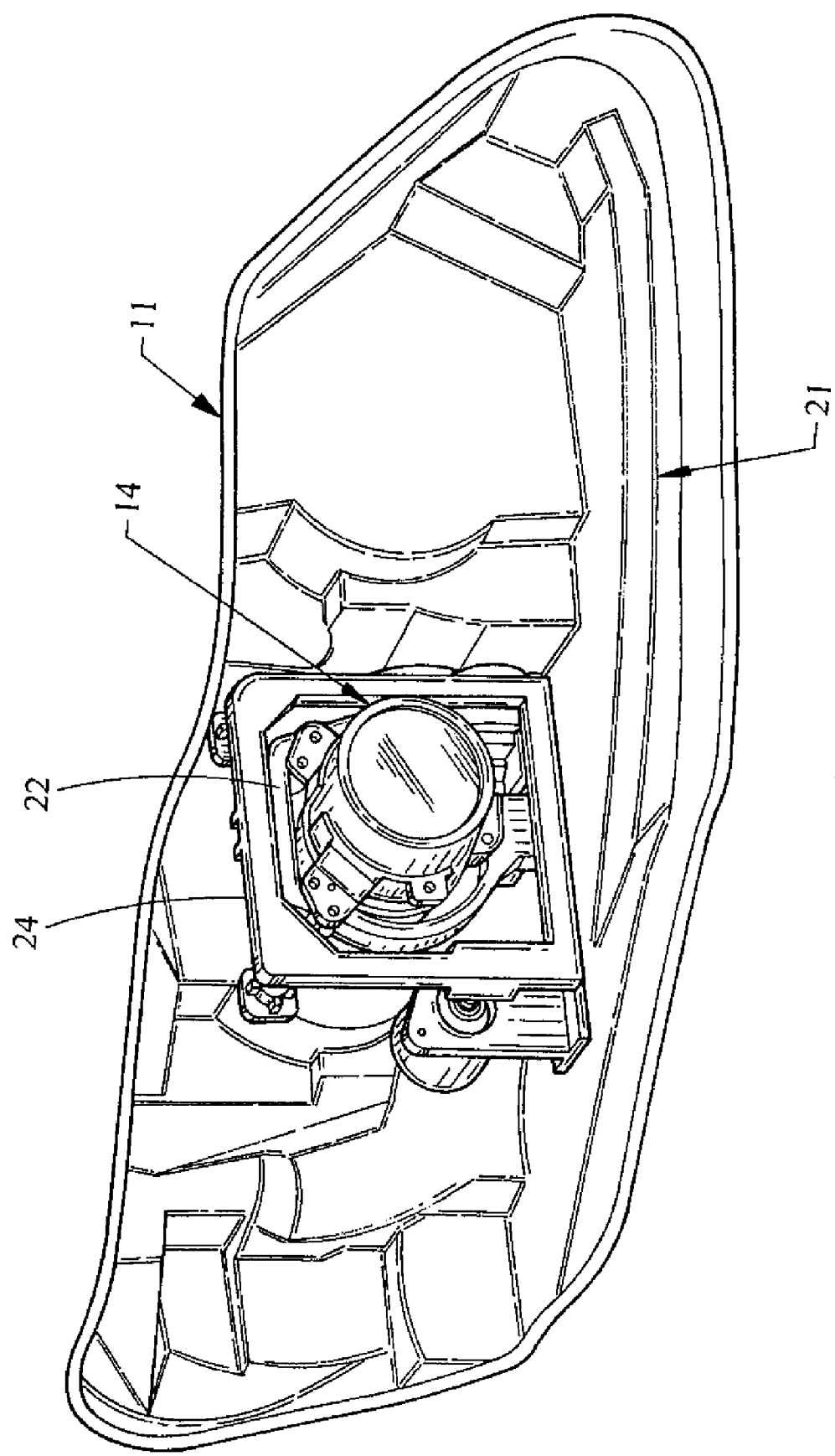
FIG. 2 illustrates a more detailed front view of the AFS system of FIG. 1.

FIG. 2 illustrates an enlarged view of the system 11 of FIG. 1. The system 11 is shown from its front side as mounted in an automobile headlamp housing 21 of the automobile 10. A headlamp bracket 22 is configured to receive the headlamp 14 to rotate the headlamp 14

An outer bracket 24 receives the headlamp bracket 22 and cooperates therewith, allowing the headlamp 14 and the headlamp bracket 22 to swivel about a plurality of axes. The housing 21 has walls defining a cavity such that the outer bracket 24 may be disposed within the cavity and mounted to the walls of housing 21. The outer bracket 24 and headlamp bracket 22 are preferably made of a plastic material, such as nylon, high density polyethylene, or any other suitable material.

Figure 3:
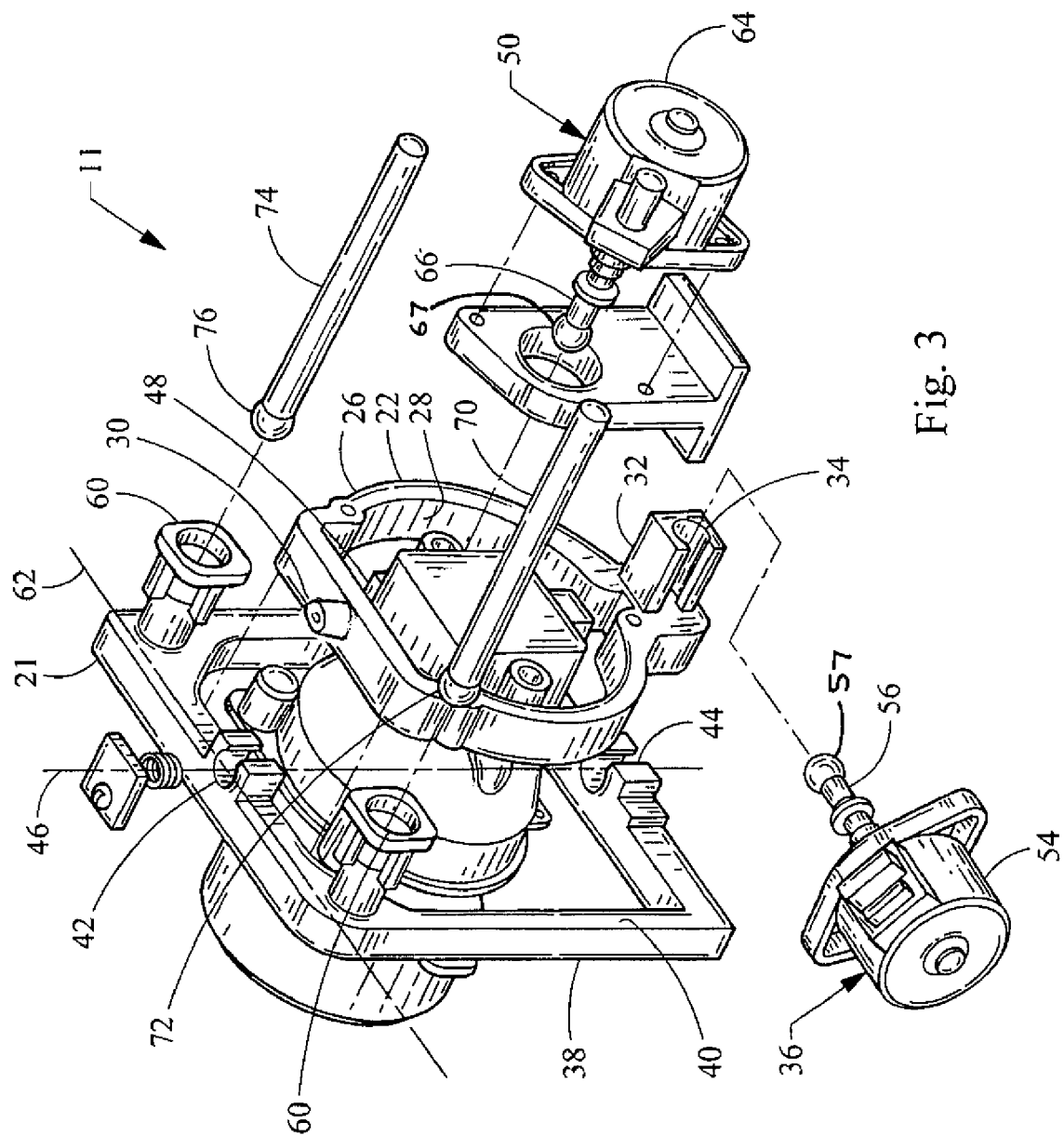
FIG. 3 illustrates an exploded rear view of the headlamp portion of FIG. 2.

FIG. 3 illustrates an exploded view of the system 11 as generally viewed from the rear. In this embodiment, the headlamp bracket 22 has an outer surface 26 and an inner surface 28. A first mounting stem 30 and second mounting stem 32 extend from the outer surface 26 of the headlamp bracket 22. The headlamp bracket 22 has a first receiving port 34 extending from a back side of the headlamp bracket 22 and is cooperable with a first motor assembly 36 for rotation of the headlamp bracket 22 within the outer bracket 24.

The outer bracket 24 also generally defines a frame has a front surface 38 and a back surface 40. A pair of receiving slots 42, 44 are formed on the back surface 40. The first and second receiving slots 42, 44 are shaped so as to receive the first and second mounting stems 30, 32 respectively, and to be cooperable therewith to allow rotation of the headlamp bracket 22 about a first axis 46. The first mounting stem 30 defines a first axis about which the headlamp bracket 22 pivots within the outer bracket 24. The outer bracket 24 has a second receiving port 48 extending from the back surface 40 and is cooperable with a second motor assembly 50 for rotation of the outer bracket 24 and headlamp bracket 22 about a second axis 62.

In this embodiment, the first motor assembly 36 includes a first motor 54 a first motor shaft 56 and a head 57. The first motor shaft 56 is actuated by the first motor 54. The head 57 slideably engages the first receiving port 34 for rotation of the headlamp bracket 22 about the first axis 46.

A plurality of sockets 60 are attached to the outer bracket 24 to define the second axis 62 about which the outer bracket 24 and headlamp bracket 22 rotate. The first mounting stem 30 is received in the first receiving slot 42 so that the headlamp bracket 22 rotates with the outer bracket 24 about the second axis 62 as the second receiving port 44 cooperates with the second motor assembly 50. In this embodiment, the plurality of sockets 60 and outer bracket 21 have threaded apertures through which screws may be disposed to secure the plurality of sockets 60 to outer bracket 24.

The second motor assembly 50 includes a second motor 64, a second motor shaft 66 and a second motor head 67. The second motor shaft 66 is actuated by the second motor 64. The head 67 slideably engages the second receiving port 48 for rotation of the outer bracket 24 and the headlamp bracket 22 about the second axis 62.

A plurality of support rods includes a first support rod 70 with ball end 72 and a second support rod 74 with ball end 76. In this embodiment, the ball ends 72 and 76 are spherically shaped. Ball ends 72 and 78 are engaged with the plurality of sockets 60 for rotation of the outer bracket 24 and headlamp bracket 22 about the second axis 62. In this embodiment, ball ends 72 and 76 are snap-fitted into the sockets 60.

In this embodiment, the first support rod 70 and the second support rod 74 are configured with the sockets 60 so as to bear the weight of the AFS system 10. In use, when the second motor assembly actuates rotation of the outer bracket 24 about the second axis 62, the headlamp 14, the headlamp bracket 22, the first motor assembly 36, and the first motor bracket 58 rotate about the second axis 62 along with outer bracket 24.

Figure 4:
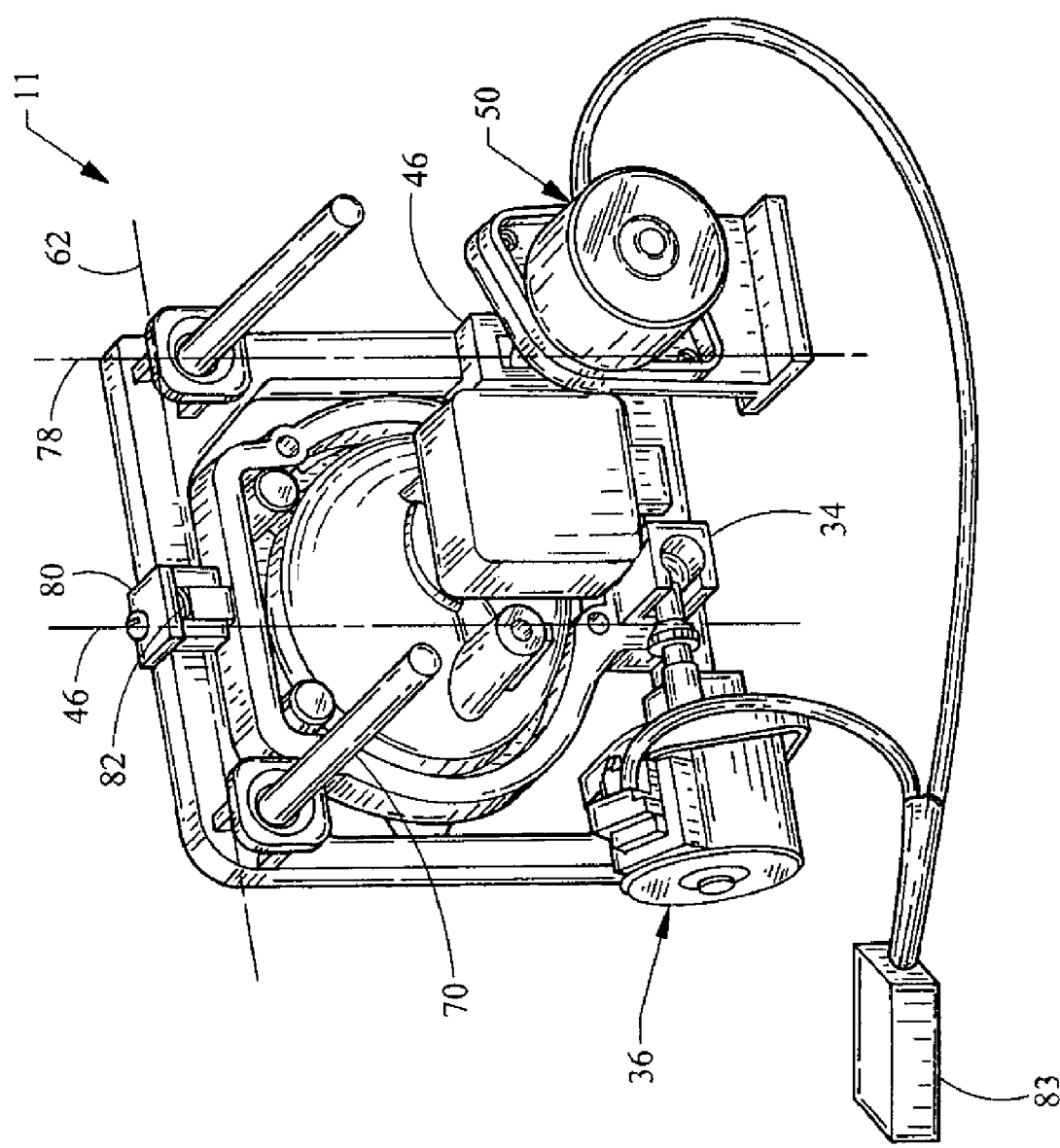
FIG. 4 illustrates a fully assembled rear view of AFS system of FIG. 1.

FIG. 4 illustrates three axes about which the headlamp body is rotated. The first receiving port 34 cooperates with the first motor assembly 36 for automatic rotation of the headlamp bracket 22 and headlamp 14 within the outer bracket 24 about the first axis 46. The second receiving port 46 cooperates with the second motor assembly 50 for automatic rotation of the outer bracket 24 and the headlamp bracket 22 about the second axis 62.

The first support rod 70 is configured to be manually rotatable so as to translate the first support rod 70 forward or backward. This translation creates horizontal rotation of the outer bracket 24 about a third axis 78 defined by the second receiving port 48 and the ball end 76 of the second support rod 72.

In this embodiment, an end cap 80 is mounted to outer bracket 24 in order to contain a spring 82 between the end cap 80 and the first mounting stem 30. The spring 82 dampens vertical vibrations in the headlamp bracket 22 generated by driving conditions. The end cap 80 and outer bracket 24 have threaded apertures through which screws may be disposed to secure the end cap 80 to the outer bracket 24. Connected to the first and second motor assemblies 36, 50 is an electronic control module 83 containing hardware for controlling the first and second motor assemblies 36, 50. The electronic control module 83 contains a processor having processor executable instructions for rotating the lamp 14 about the axes 46, 62 and 78. Additionally, the control module 83 contains processor executable instruction for calibrating the AFS system 11, which will be described in the paragraphs that follow.

Figure 5:
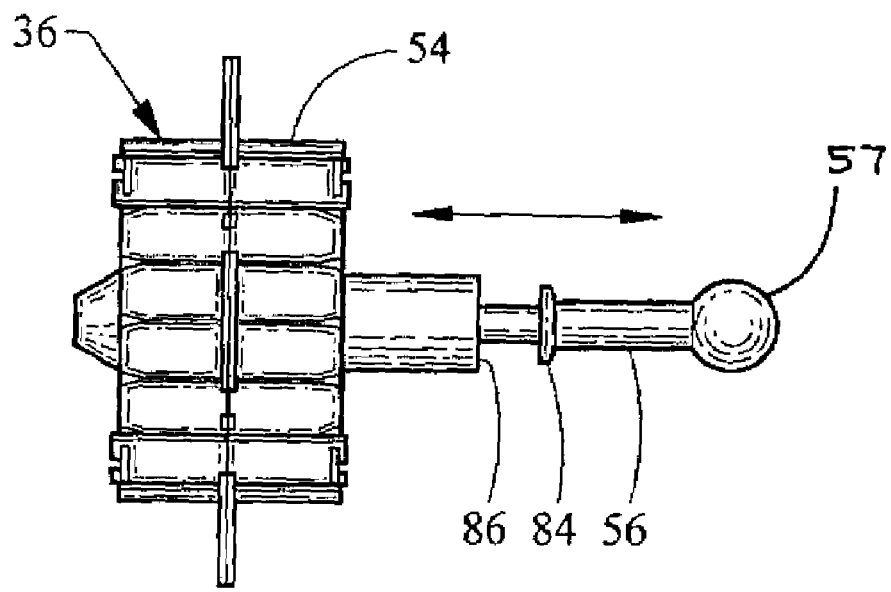
FIG. 5 illustrates a motor assembly in a fully extended position.
Figure 6:
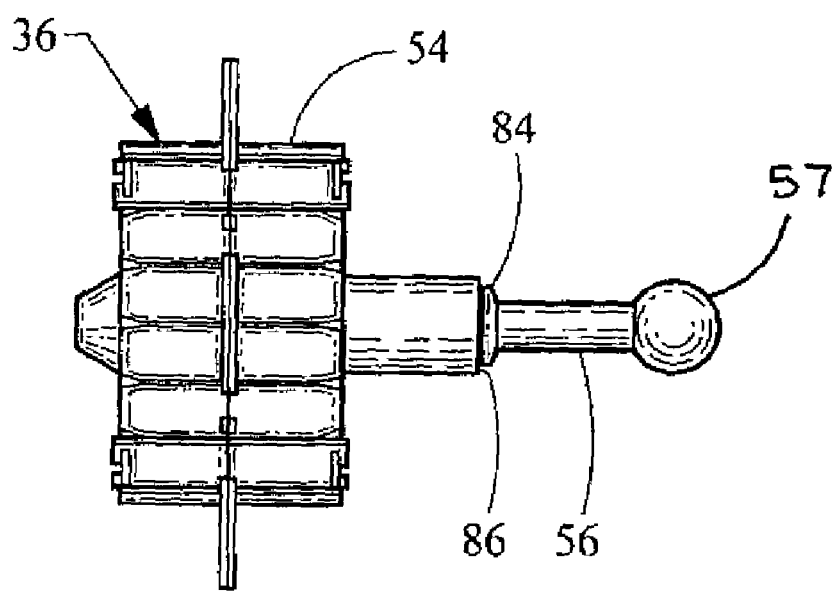
FIG. 6 illustrates the motor assembly in a fully retracted position.

Referring to FIGS. 1, 5 and 6, a more detailed view of the first motor assembly 36 is shown in its extended and retracted positions are shown. Since the second motor assembly 50 is similar to the first motor assembly 36, the following description given for the first motor assembly 36 is equally applicable to the second motor assembly 50. As stated previously, the first motor assembly 36 includes the motor 54 and the shaft 56. The motor 54 moves the shaft 56 between a fully extended position (as shown in FIG. 5) and a fully retracted position (as shown in FIG. 6). The shaft 56 includes a stopper 84 configured to engage an abutment 86. As shown in FIG. 6, when the stopper 84 engages the abutment 86, the motor 84 cannot retract the shaft 56 further. Thus, the abutment 86 acts as a hard stop, preventing the headlamp 14 from rotating further.

When the first motor assembly 36 is in a fully extended position, the lamp 14 will be rotated to the left of the center line 18 by approximately 70. When the motor assembly 36 is in a fully retracted position, the lamp 14 will be rotated to the right of the center line 18 by approximately 15°. Of course, it should be understood that the above mentioned degrees are only examples and can be modified for different applications.

Figure 7:
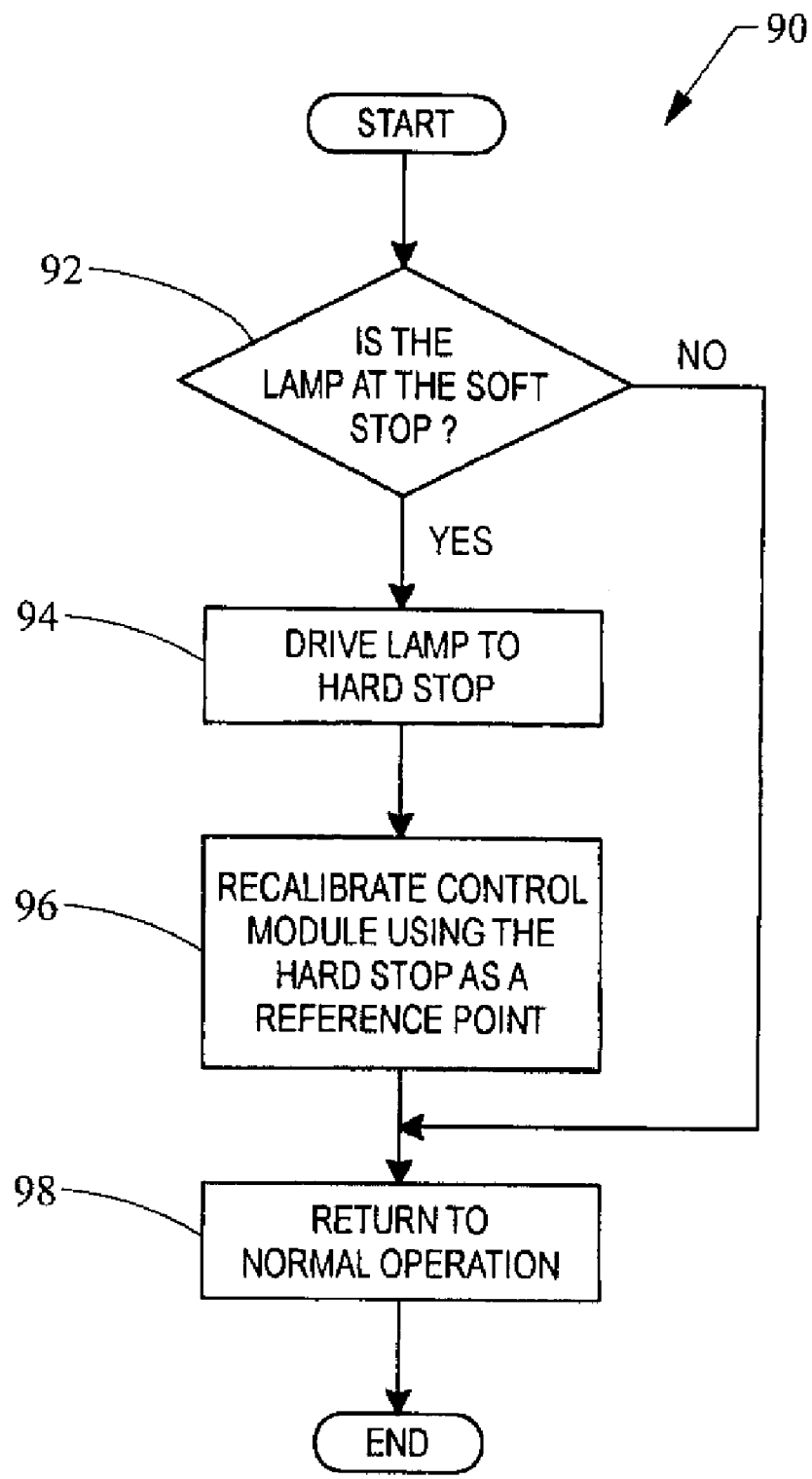
FIG. 7 is a flow chart of the method employed to calibrate the AFS system of FIG. 1.

Referring to FIGS. 1, 6 and 7, a method 90 for calibrating the AFS system 11 is shown. In step 92, a determination is made if the lamp 14 is at a soft stop. The soft stop is a position of the lamp 14 as determined by software. Generally, when the lamp is near the soft stop position, the stopper 84 of the motor assembly 36 is very near the abutment 86, but not yet in contact with the abutment 86. For example, the soft stop could be when the lamp 14 is about 14.5 degrees to the right of the centerline 18.

As shown in step 94, in the event the lamp is at the soft stop, the motor 54 of the motor assembly 36 drives the lamp to a hard stop, which may be at 15 degrees to the right of the center line 18. This is accomplished by driving the stopper 84 into the abutment 86, which functions as a hard stop. Of course, other embodiments may contemplate using portions of the housing 21 of even the automobile 10 to act as a hard stop. In step 96, the control module 82 recalibrates itself using the hard stop as a reference point.

Thereafter, the AFS system 12 returns to normal operations, as indicated in step 98. Because this slight change in the position of the head lamp 14 is minor, an operator of the automobile 10 will be unaware that the head lamp has been driven the hard stop and has been recalibrated. Because it is very common for the head lamp 14 the soft stop, the system will calibrates itself several times during the operation of the automobile 10.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A system for dynamically recalibrating an adaptive lighting system, the system comprising:

a lamp pivotably mounted to a frame, wherein the lamp is configured to rotate about a central axis between a first hard stop and a second hard stop, a center line being located between a first hard stop and a second hard stop, a center line being located between the first and second hard stop;

a stepper motor coupled to the lamp, the motor configured to rotate the lamp between the first hard stop and the second hard stop; and a control module in electrical communication with the motor, wherein the control module is configured to instruct the motor to rotate the lamp between a first soft stop and a second soft stop, the first soft stop being located between the first hard stop and the center line and the second soft stop being located between the second hard stop and the center line; and wherein the control module is further configured to instruct the motor to rotate the lamp to the first hard stop when the lamp positioned at the first soft stop and to recalibrate the control module using the first hard stop as a reference point; wherein the lamp is a headlamp for an automobile.

2. The system of claim 1, wherein the first hard stop is about 18 degrees from the center line.

3. The system of claim 1, wherein the first soft stop is about 15 degrees from the center line.

4. The system of claim 1, wherein the control module is further configured to instruct the motor to rotate the lamp to the second hard stop when the lamp positioned at the second soft stop and to recalibrate the control module using the second hard stop as the reference point.

5. The system of claim 4, wherein the second hard stop is about 18 degrees from the center line.

6. The system of claim 4, wherein the second soft stop is about 15 degrees from the center line.

7. The system of claim 1, wherein the control module is configured to instruct the motor to rotate the lamp to a position corresponding to a steering angle position of the automobile.

* * * * *